United States Patent [19]

Felder

[11] Patent Number: 4,598,814
[45] Date of Patent: Jul. 8, 1986

[54] RETARDING CONVEYOR FOR CARGO WITH OUTWARD-TRANSFER STATION

[75] Inventor: Christian Felder, Dreieichenhain, Fed. Rep. of Germany

[73] Assignee: Gebhardt Fordertechnik GmbH, Fed. Rep. of Germany

[21] Appl. No.: 556,120

[22] Filed: Nov. 29, 1983

[51] Int. Cl.[4] ............................................. B65G 47/46
[52] U.S. Cl. ..................................... 198/369; 198/592
[58] Field of Search ............... 198/592, 435, 781, 783, 198/369, 436, 437, 584, 864, 861.2, 861.3

[56] References Cited

U.S. PATENT DOCUMENTS 2,883,033  4/1959  Armstrong et al. ............. 198/592 X
3,513,960  5/1970  Adams ............................ 198/783 X
4,291,796  9/1981  Gebhart ......................... 198/781 X

FOREIGN PATENT DOCUMENTS 162724  8/1948  Austria ............................... 198/592

*Primary Examiner*—Joseph E. Valenza
*Assistant Examiner*—Jonathan D. Holmes
*Attorney, Agent, or Firm*—Craig and Burns

[57] ABSTRACT

The invention relates to a retarding conveyor for cargo with an outward-transfer station at one location at least, with a sectionally subdivided, drivable conveying apparatus carrying the pieces of cargo, each section being drivable by an intermediate roller driven by a constantly revolving traction device, this intermediate roller being adjustable from the driving position into an idling position employing a feeler extending into the path of motion of the cargo. Such a retarding conveyor is to be provided with a large stowing volume, as well as a large number of outward-transfer stations through which transfer-out additionally takes place at high velocity. For this purpose, a section (5, 5',5") of the conveying apparatus (2) is supported, as the outward-transfer station, in a segmented frame (6) tiltable about a folding axle (10) arranged in parallel to the conveying plane, this segmented frame being adjustable by an auxiliary force into an inclined tilting position terminating toward a conveyor (11, 11') arranged at an offset level, wherein the drive connection to a traction device (4) is constantly present or can be established, respectively.

16 Claims, 9 Drawing Figures

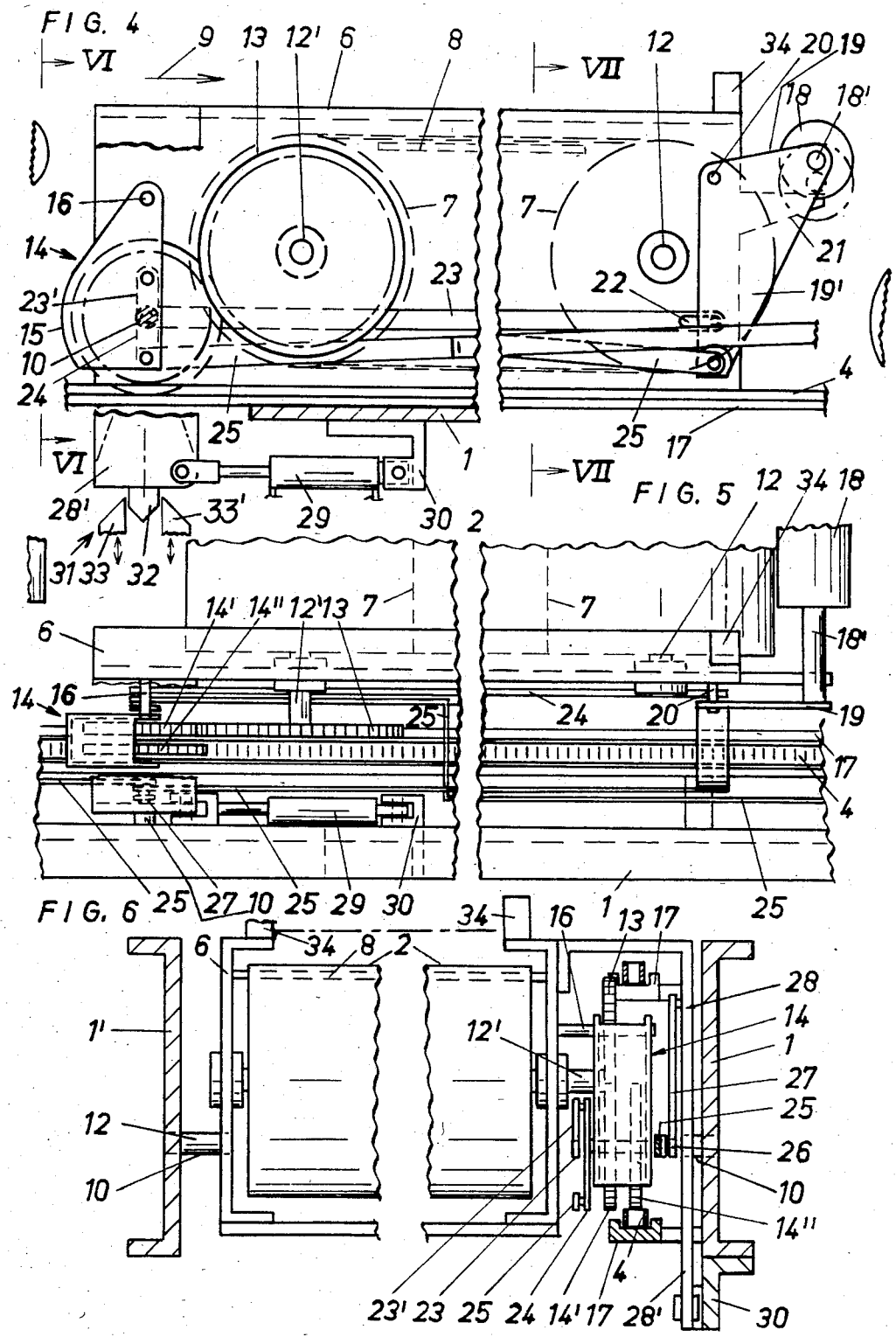

RETARDING CONVEYOR FOR CARGO WITH OUTWARD-TRANSFER STATION

The invention relates to a retarding conveyor for cargo with outward-transfer station at one location at least, with a sectionally subdivided, drivable conveying means carrying the pieces of cargo, each section being drivable by an intermediate roller driven by a constantly revolving traction means, this intermediate roller being adjustable from a driving position into an idling position by means of a feeler extending into the path of motion of the cargo.

A retarding conveyor for cargo of the type described hereinabove has been known from DOS (German Unexamined Laid-Open Application) No. 2,853,483, see U.S. Pat. No. 4,291,796. In this conveyor, the pieces of cargo are transported along the retarding conveyor and can, if desired, be transferred out toward one side by means of special removal stations. Each removal station, since it is a separate installation, requires not only operational effort, but also needs its own area of space which is useless as stowing space.

German Utility Model No. 8,017,695 discloses a conveyor belt gate wherein, at the end of a conveying path, a device is provided with a gate conveyor belt hinged about a horizontal axis, whereby the cargo can be selectively transferred into an upper conveying path or into a conveying path continuing at a lower level. This gate conveyor belt possesses its own drive mechanism and represents a continuously operating apparatus unsuitable for stowing purposes. Such an installation also requires its own space, useless as stowing space. The conventional arrangements for transferring a piece of cargo out of a continuous transport path are therefore expensive from the viewpoints of operation and space, and moreover reduce the stowing volume. Therefore, only a relatively small number of outward-transfer stations can be located along the zone of a retarding conveyor so that the stowing volume is not excessively reduced.

It is thus an object of the invention to provide a retarding conveyor having a large stowing volume and a large number of outward-transfer stations through which outward transfer takes place at high velocity.

This object has been attained by the invention in that, as the outward-transfer station, a section of the conveying means is supported in a segmented frame foldable about a folding axis arranged in parallel to the conveying plane, this segmented frame being adjustable by means of an auxiliary force into an oblique tilting position terminating toward a conveying means arranged at an offset level, wherein the driving connection to the traction means is constantly present or can be established, respectively.

The advantages attained by means of the invention reside particularly in that the entire length of the retarding conveyor can be utilized for stowing cargo, and also each section can simultaneously be fashioned as an outward-transfer station. The amount stowed thus corresponds to that of a normal retarding conveyor with the possibility of effecting outward transfer at any stowing location. Therefore, the outward-transfer station does not require its own space; consequently, the entire conveying length can be utilized as stowing space, just as has been previously possible in a conveyor having merely a stowing function. On the other hand, the outwardly pivoting movement required for outward transfer can be executed in such a short time that transport along the retarding conveyor can take place at customary speed. Therefore, the retarding conveyor of this invention combines the function of stowing with that of outward transfer without requiring increased amounts of space. Consequently, the retarding conveyor fulfills stowing and distributing tasks simultaneously.

It is another object of the invention to provide a retarding conveyor for cargo with an outward-transfer station at at least one location with a sectionally subdivided drivable conveying means carrying the pieces of cargo, each section being drivable by an intermediate roller driven by a constantly revolving traction means, the intermediate roller being adjustable from a driving position into an idling position by means of a feeler extending into the path of motion of the cargo, a section of the conveying means constituting an outward-transfer station being supported in a segmented frame tiltable about a tilting axle arranged in parallel to the conveying plane, the segmented frame being adjustable by an auxiliary force into an inclined tilting position terminating toward a conveying means arranged at an offset level, wherein the drive connection to the traction means is constantly present or can be established.

It is another object of the invention to provide a retarding conveyor wherein a segmented frame is fashioned to be foldable in a downward and upward direction.

It is another object of the invention to provide a retarding conveyor wherein an intermediate roller is associated with each of a plurality of sections of the conveyor, the roller being articulated to the segmented frame approximately coaxially to a tilting axle.

It is another object of the invention to provide a retarding conveyor wherein a feeler is pivotably mounted on the free end of a section of the conveyor at a segmented frame to feeler levers and is connected by a shifting rod to an intermediate roller of the same section of conveyor and by a shifting linkage to an intermediate roller of an adjacent section of the conveyor located in opposition to the conveying direction, the shifting linkage being an extension of the tilting axle exhibiting a joint arranged on a holding arm articulated to the segmented frame.

It is another object of the invention to provide a retarding conveyor wherein a feeler comprises a switching roller lying in a depreseed switching position on a stop affixed to a segmented frame of the conveyor.

It is another object of the invention to provide a retarding conveyor wherein the conveying means of the sections of the conveyor comprise a belt conveyor or a chain conveyor.

It is another object of the invention to provide a retarding conveyor wherein the conveying means of the sections of the conveyor comprise a roller conveyor having rollers drivingly connected with one another.

The foregoing and other objects, features and advantages of the present invention will become more apparent from the following description when taken in connection with the accompanying drawings which show, for the purposes of illustration only, plural embodiments in accordance with the present invention, and wherein:

FIG. 4 shows a lateral or side view of a section;

FIG. 5 shows a partial top view of the section according to FIG. 4;

FIG. 6 shows a sectional view along line VI—VI of FIG. 4;

Figure 1:
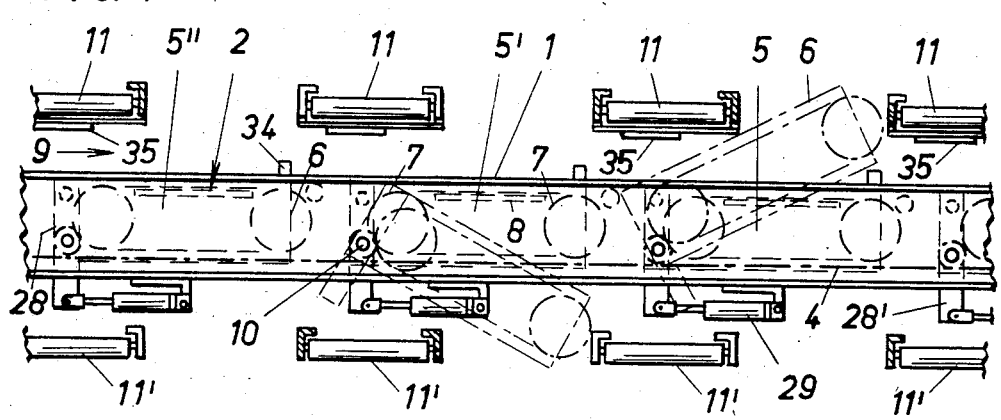
FIG. 1 shows a lateral or side view of the retarding conveyor.
Figure 2:
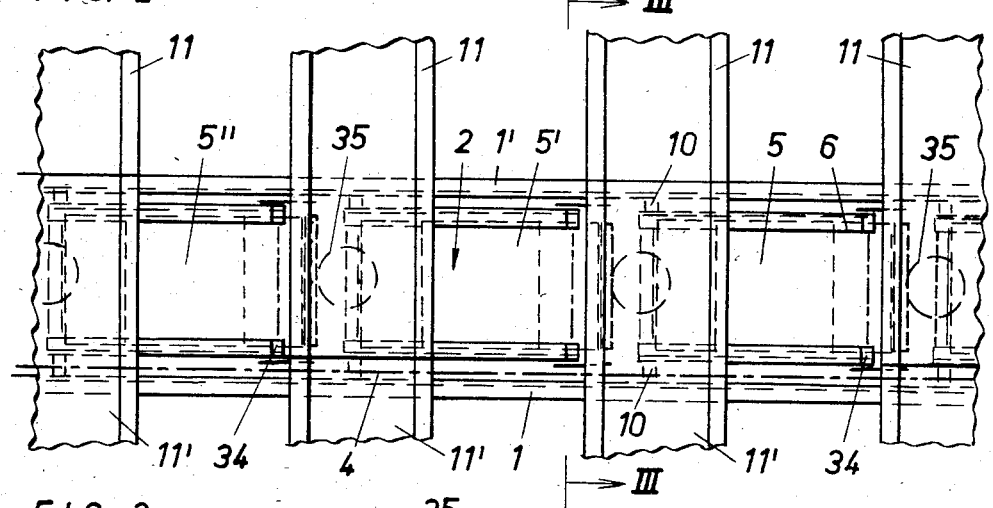
FIG. 2 shows a top view of the retarding conveyor.
Figure 3:
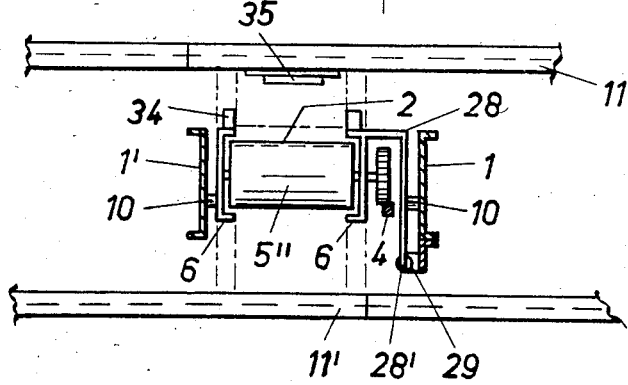
FIG. 3 shows a sectional view along line III—III of FIG. 2.
Figure 7:
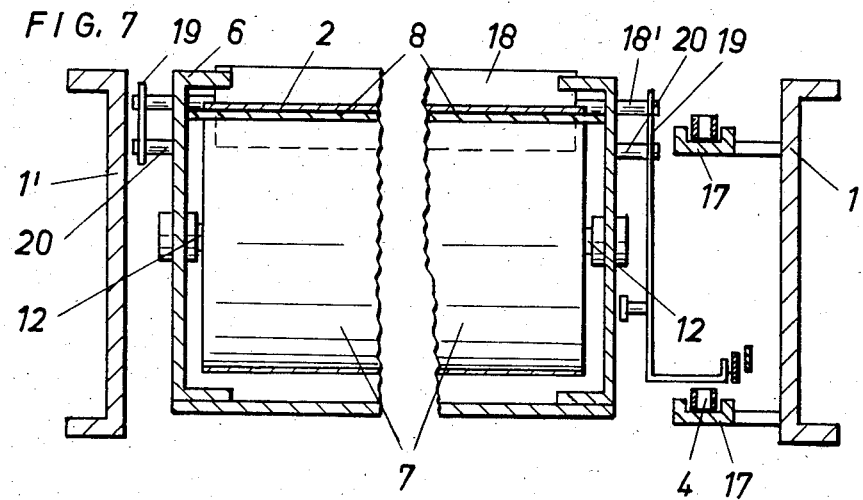
FIG. 7 shows a sectional view along line VII—VII of FIG. 4.

Referring now to the figures and in particular to FIGS. 1-3, the retarding conveyor comprises a conveying means 2 in the shape of a conveyor belt, conveyor chains, or the like, or supporting rollers, between parallel longitudinal frames 1 and 1'. The conveying means 2 is subdivided into several series-arranged sections 5, 5', 5", each of which can be driven by means of an intermediate roller 14 independently of one another by a revolving traction means 4, especially a chain. The traction means 4 is driven from the left toward the right as seen in FIG. 1 by means of a motor, not illustrated.

Each section, such as 5, is supported in a segmented frame 6 wherein guide rollers 7 are rotatably disposed at both ends; the guide rollers 7 are encompassed by the band-shaped conveying means 2. Depending on the construction of the band-shaped conveying means 2, a support 8 for absorbing the pressure force produced by the cargo to be transported is provided between the guide rollers 7. Assuming a conveying direction oriented from the left toward the right in accordance with arrow 9, the segmented frame 6 is articulated at the left-hand end, lying in opposition to the conveying direction 9, on a folding axle 10 to the longitudinal frames 1 and 1' and can be flipped in the upward and/or downward direction out of the conveying plane of the retarding conveyor, as indicated in dot-dash lines in FIG. 1. Distribution lanes 11 and 11' associated with the respective tilted position of the sections, such as 5, and arranged at right angles to the conveying direction 9 are disposed above and/or below; these distribution lanes lead directly or indirectly to a specific destination and can be of any desired structureal configuration. However, preferably these distribution lanes are driven at lanes in the transfer zone from the said section. It can be seen that pieces of cargo transported on the conveying means 2 can be transferred out selectively by tilting one of the sections, such as 5, acting as the outward-transfer station, in the upward or downward direction and can be passed on to a predetermined destination.

As can be seen more clearly from FIGS. 4-7, the guide rollers 7 of each section, such as 5, are rotatably mounted on axles 12 in the segmented frame 6. At the inlet end of the segmented frame 6, the axle 12' is fashioned as a shaft extending through the segmented frame 6 and carries on the outside a drive wheel 13 designed as a gear wheel in the present embodiment. A corresponding counter wheel 14', FIGS. 5 and 6, of an intermediate roller 14 is in driving connection with this drive wheel 13 when the roller is in its driving position. The counter wheel 14' is rigidly coupled to a driving sprocket 14" and mounted together with the latter in a housing 15, FIG. 4, to be rotatable therein. The housing is supported in pendulating fashion approximately vertically above the axis of rotation of the counter wheel 14' to be movable about a pivot axle 16 attached to the frame 6, so that the intermediate roller 14 can be pivoted about axle 16 from the driving position illustrated in the clockwise direction into an idling position wherein the counter wheel 14' is out of engagement with the drive wheel 13. The driving sprocket 14" is driven by the traction means 4, FIG. 5, and preferably remains in constant driving connection therewith. If the traction means 4 is fashioned as a chain, the driving sprocket 14" is correspondingly designed as a chain of the traction means 4, i.e., even in the idling position. In order to support the traction means 4, supporting profiles 17 are provided which are attached to the longitudinal frame 1.

A feeler 18, FIGS. 4 and 5, designed, for example, as a roller serves for controlling the intermediate roller 14. The feeler 18 is arranged on both sides on feeler levers 19 which latter can swing about axles 20 mounted at the outlet-end side of the frame 6 perpendicularly to the conveying plane of the cargo on the conveying means 2. The feeler 18 normally projects into the conveying plane of the cargo and can be urged downwardly by the cargo into a switching position located on the outside, as indicated in dot-dash lines in FIG. 4. In this switching position, the axle 18' of the feeler 18 is disposed on a stop 21 of the segmented frame 6 and thus serves as a support for the cargo sliding thereover. The feeler lever 19 located on the side of the intermediate roller 14 has a downwardly extending arm 19', a shifting rod 23 being articulated through a slotted hole 22 to the arm 19' at the bottom thereof. With its other, upwardly angled end 23', the shifting rod 23 is articulated to the upper end of a double lever 24. The latter is pivotably mounted coaxially to the axis of the counter wheel 14' at the housing 15 of the intermediate roller 14 of the same section, such as 5. A shifting linkage 25 is articulated to the lower end of the double lever 24 and is connected with its other end to the arm 19' of the feeler lever 19 of the said section located upstream thereof as seen in the conveying direction. In order to avoid interference with the control operation when the segmented frame 6 is tilted, the shifting linkage 25 is made of two parts and is equipped with a joint 26, FIG. 6, at the separating site, which joint 26 is arranged approximately coaxially to the folding axle 10 at a holding arm 27. The latter is articulated to an adjusting arm 28 carrying the folding axle 10, the adjusting arm 28 bridging the intermediate roller 14 at the top and being attached to the segmented frame 6.

A servo cylinder 29 is connected to a downwardly projecting extension 28' of the adjusting arm 28. The cylinder 29 is mounted to a support 30 at the longitudianl profile 1. If the segmented frame 6 is tilted only in one direction, i.e., upwardly or downwardly, then the two end positions can be fixed by the stroke route of the servo cylinder 29. In contrast thereto, if tilting is to be carried out selectively in the upward or downward direction, then a locking means 31 is provided, as illustrated in FIG. 4, for example. In this arrangement, a bevel-top stop 32 projecting in the downward direction is provided at the lower end of the extension 28' contacted on both sides by adjusting wedges 33 and 33' in the conveying position; these adjusting wedges 33 and 33' can be adjusted by means of an auxiliary force, e.g., servo cylinders, from the illustrated blocking position into a release position in the downward direction, so that the segmented frame 6 can be tilted into one or the other direction, as indicated in dot-dash lines.

If pieces of cargo are transported on the conveying means 2, the piecemeal arresting of the pieces of cargo in case of a pileup or storage operation is effected by cutting out the respective section, such as 5. If a feeler 18, FIG. 4, is depressed for this reason, the shifting linkage 25 adjusts the double lever 24 of the intermediate roller 14 pertaining to the said section lying therebehind in opposition to the conveying direction, so that the slotted hole 22, by shifting of the shifting rod 23 toward the right, passes into its other end position. If now the feeler 18 also of this section is likewise depressed, then the shifting rod 23 is urged toward the left by the shifting movement in the clockwise direction and, since the shifting linkage 25 remains stationary, the intermediate roller 14 is displaced in the clockwise direction into the idling position. The drive is interrupted, and the cargo will come to a standstill. If, in contrast thereto, the feeler 18 of said section disposed in front thereof in the conveying direction is released, then the intermediate roller 14 of the section lying therebehind can pivot back into the driving position due to the tractive force of the traction means 4 and/or additionally by means of spring force. The driving connection has been reestablished, and the piece of cargo disposed on the conveying means 2 resumes its further conveyance.

A reading station 35, FIGS. 1-3, reading off the coding provided on the cargo is arranged in the zone of each section, such as 5, thereabove or beside such section, read-out being preferably independent of the respective angular position to the conveying direction. The result is transmitted to the associated said section, especially to the section which follows in the conveying direction 9, so that with further transport being resumed the connected said section is tilted upwardly or downwardly, if the coding is the appropriate one, in order to satisfactorily transfer out the respective piece of cargo. Exiting from the said section can additionally be monitored by a light barrier 34 arranged at the outlet end so that the tilting of the segmented frame 6 takes place in a minimum time period to attain smooth cargo transport with customary speed.

Figure 8:
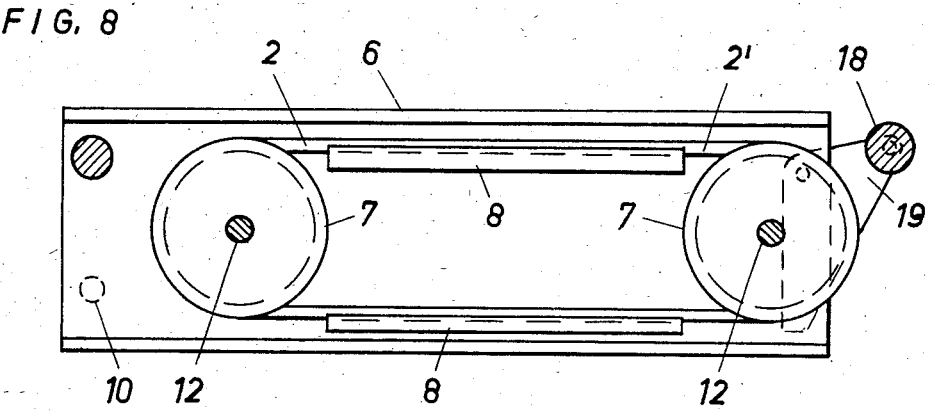
FIG. 8 shows a lateral view of a section having a different design.

In a further embodiment, the conveying means 2 can also be fashioned as a chain conveyor according to FIG. 8 wherein the chains 2' carrying the cargo are guided over correspondingly mounted supports 8.

Figure 9:
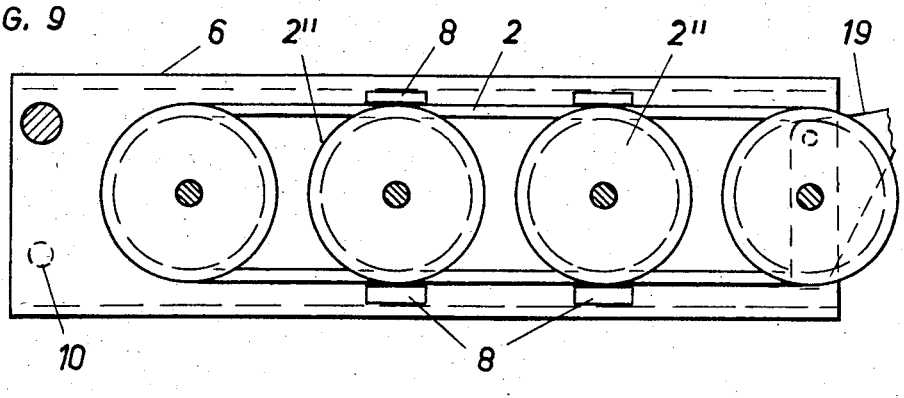
FIG. 9 shows a lateral view of a section in a further embodiment.

In another embodiment according to FIG. 9, the conveying means 2 can also consist of several supporting rollers 2", driven in combination, for example, by a revolving traction means, such as a chain or a V-belt, common to all rollers, whenever the intermediate roller 14, not shown, is in the driving position.

While I have shown and described several embodiments in accordance with the present invention, it is understood that the same is not limited thereto but is susceptible to numerous changes and modifications as known to one having ordinary skill in the art, and I therefore do not wish to be limited to the details shown and described herein, but intend to cover all such modifications as are encompassed by the scope of the appended claims.

What is claimed is:

1. A retarding conveyor for cargo comprising an outward-transfer station at at least one location with a sectionally subdivided, drivable conveying means carrying the pieces of cargo, each section being drivable by an intermediate roller driven by a constantly revolving traction means,
    the intermediate roller being adjustable from a driving position into an idling position by means of a feeler extending into the path of motion of the cargo, constituting an outward-transfer station,
    a section of the conveying means being supported in a segmented frame tiltable about a tilting axle arranged in parallel to the conveying plane, the segmented frame being adjustable by an auxiliary force means into an inclined tilting position terminating toward a conveying means arranged at an offset level and means responsive to cargo contact with said feelers for engaging and disengaging drive connection between the traction means and the intermediate roller of an adjacent upstream section.

2. A retarding conveyor according to claim 1, wherein
    the segmented frame is fashioned to be foldable in one of a downward and upward direction viewed in the conveying direction.

3. A retarding conveyor according to claim 1, wherein
    an intermediate roller is associated with each section, the roller being articulated to the segmented frame approximately coaxially to the tilting axle.

4. A retarding conveyor according to claim 3, wherein
    at least one feeler is pivotably mounted on the free end of a section of the segmented frame to feeler levers and is connected by a shifting rod to the intermediate roller of the same section and by a shifting linkage to the intermediate roller of the same section and by a shifting linkage to the intermediate roller of the adjacent section located upstream of the conveying direction, wherein the shifting linkage, in extension of the tilting axle, exhibits a joint arranged on a holding arm articulated to the segmented frame.

5. A retarding conveyor according to claim 4, wherein
    the feeler comprises a switching roller, lying in a switching position depressed with respect to conveying plane of cargo on a stop fixed to the segmented frame.

6. A retarding conveyor according to claim 1, wherein
    the feeler is pivotably mounted on the free end of the section at the segmented frame to feeler levers and is connected by a shifting rod to the intermediate roller of the same section and by a shifting rod to the intermediate roller of the same section and by a shifting linkage to the intermediate roller of the adjacent section located upstream of the conveying direction, wherein the shifting linkage, in extension of the tilting axle, exhibits a joint arranged on a holding arm articulated to the segmented frame.

7. A retarding conveyor according to claim 1, wherein
    the feeler comprises a switching roller lying in a switching position depressed with respect to a conveying plane of cargo on a stop affixed to the segmented frame.

8. A retarding conveyor according to claim 1, wherein
    the conveying means of the sections comprises one of a belt conveyor and chain conveyor.

9. A retarding conveyor according to claim 1, characterized in that the conveying means of the sections comprises a roller conveyor having rollers drivingly connected with one another.

10. A retarding conveyor for cargo comprising an outward-transfer station at at least one location, with a sectionally subdivided, drivable conveying means carrying the pieces of cargo, each section being drivable by an intermediate roller driven by a constantly revolving traction means, the intermediate roller being adjustable from a driving position into an idling position by means of a feeler extending into the path of motion of the cargo, a section of the conveying means constituting an outward-transfer station is supported in a segmented frame tiltable about a tilting axle arranged in parallel to the conveying plane, the segmented frame being adjustable by an auxiliary force means into an inclined tilting position terminating toward a conveying means arranged at an offset level, means responsive to cargo contact with said feelers for engaging and disengaging drive connection between the traction means and the intermediate roller of an adjacent upstream section, the segmented frame being fashioned to be foldable in one of a downward and upward direction, and an intermediate roller is associated with each section, the roller being articulated to the segmented frame approximately coaxially to the tilting axle.

11. A retarding conveyor according to claim 10, wherein the conveying means of the sections is constructed as a belt conveyor or chain conveyor.

12. A retarding conveyor according to claim 10, wherein the conveying means of the sections is fashioned as a roller conveyor, the rollers of which are drivingly connected with one another.

13. A retarding conveyor for cargo comprising an outward-transfer station at at least one location, with a sectionally subdivided, drivable conveying means carrying the pieces of cargo, each section being drivable by an intermediate roller driven by a constantly revolving traction means, the intermediate roller being adjustable from a driving position into an idling position by means of a feeler extending into the path of motion of the cargo, a section of the conveying means constituting an outward-transfer station is supported in a segmented frame tiltable about a tilting axle arranged in parallel to the conveying plane, the segmented frame being adjustable by an auxiliary force means into an inclined tilting position terminating toward a conveying means arranged at an offset level, means responsive to cargo contact with said feelers for engaging and disengaging drive connection between the traction means and the intermediate roller of an adjacent upstream section, the segmented frame being fashioned to be foldable in one of a downward and upward direction, and at least one feeler being pivotably mounted on the free end of a section at the segmented frame to feeler levers and is connected by a shifting rod to the intermediate roller of the same section and by a shifting linkage to the intermediate roller of the adjacent section located in opposition to the conveying direction, wherein the shifting linkage, in extension of the tilting axle, exhibits a joint arranged on a holding arm articulated to the segmented frame.

14. A retarding conveyor according to claim 13, wherein the feeler comprises a switching roller lying in a switching position depressed with respect to a conveying plane of cargo on a stop fixed to the segmented frame.

15. A retarding conveyor according to claim 13, wherein the conveying means of the sections is constructed as a belt conveyor or chain conveyor.

16. A retarding conveyor according to claim 13, wherein the conveying means of the sections is fashioned as a roller conveyor, the rollers of which are drivingly connected with one another.

* * * * *